(12) United States Patent
Jesel

(10) Patent No.: US 8,690,507 B1
(45) Date of Patent: Apr. 8, 2014

(54) LOAD BEARING ASSEMBLY

(75) Inventor: Daniel H. Jesel, Lakewood, NJ (US)

(73) Assignee: Jesel, Inc., Lakewood, NJ (US)

( * ) Notice: Subject to any disclaimer, the term of this patent is extended or adjusted under 35 U.S.C. 154(b) by 201 days.

(21) Appl. No.: 13/036,190

(22) Filed: Feb. 28, 2011

Related U.S. Application Data

(60) Provisional application No. 61/308,731, filed on Feb. 26, 2010.

(51) Int. Cl.
*F16B 43/00* (2006.01)

(52) U.S. Cl.
USPC .......................................... 411/533; 411/149

(58) Field of Classification Search
USPC ................. 411/533, 337, 353, 368, 370, 372
See application file for complete search history.

(56) References Cited

U.S. PATENT DOCUMENTS

| | | | | |
|---|---|---|---|---|
| 2,145,744 A * | 1/1939 | Whitney | .................... | 174/152 R |
| 2,521,567 A * | 9/1950 | Corrigan et al. | ............. | 411/517 |
| 3,301,121 A * | 1/1967 | Newcomer | .................... | 411/368 |
| 3,417,802 A * | 12/1968 | Oldenkott | ...................... | 411/134 |
| 4,072,081 A | 2/1978 | Curtis et al. | | |
| 4,571,133 A | 2/1986 | Lindow | | |
| 5,203,656 A * | 4/1993 | McKinlay | ...................... | 411/149 |
| 5,564,875 A * | 10/1996 | Matthews | ...................... | 411/428 |
| 6,712,031 B2 | 3/2004 | Harada et al. | | |
| 7,857,565 B2 * | 12/2010 | Martinson | ...................... | 411/136 |
| 2007/0098524 A1 * | 5/2007 | Dunlap et al. | ................ | 411/533 |

* cited by examiner

*Primary Examiner* — Gary Estremsky
(74) *Attorney, Agent, or Firm* — Timothy J. Klima; Shuttleworth & Ingersoll, PLC

(57) ABSTRACT

A load bearing assembly includes a first outer washer having an outwardly exposed annular surface for engaging a clamping surface of a fastener and a second outer washer having an annular surface outwardly exposed in an opposite direction from the outwardly exposed annular surface of the first outer washer, the outwardly exposed annular surface of the second outer washer for engaging a clamping surface of an object to which the fastener exerts a clamping force. An intermediate washer is positioned between the first outer washer and the second outer washer. A locking mechanism engages between the first and second outer washers to axially interconnect the washers together in a stacked configuration with the intermediate washer positioned between the first and second outer washers and in a manner so that the washers are rotatable with respect to one another.

24 Claims, 5 Drawing Sheets

LOAD BEARING ASSEMBLY

This application claims priority to U.S. Provisional Patent Application 61/308,731 filed Feb. 26, 2010, the entirety of which is incorporated by reference herein.

TECHNICAL FIELD

This disclosure relates to washers as used with threaded fasteners, and more specifically relates to a load bearing assembly that reduces or prevents galling of a clamping surface.

BACKGROUND INFORMATION

As is well known, washers perform a number of functions in fastener assemblies. One such function of a washer is to serve as a seat for bolts, nuts and screws and to distribute load over an area greater than that provided by the fastener head surface. However, the action of the washers on a clamping surface can cause galling of the clamping surface.

SUMMARY

In accordance with one aspect of the present invention, a load bearing assembly includes a first outer washer having an outwardly exposed annular surface for engaging a clamping surface of a fastener and a second outer washer having an annular surface outwardly exposed in an opposite direction from the outwardly exposed annular surface of the first outer washer, the outwardly exposed annular surface of the second outer washer for engaging a clamping surface of an object to which the fastener exerts a clamping force. An intermediate washer is positioned between the first outer washer and the second outer washer; wherein each washer has an internal axial bore for positioning over a body of at least one of the fastener and a stud portion to which the fastener fastens. A locking mechanism engages between the first and second outer washers to axially interconnect the washers together in a stacked configuration with the intermediate washer positioned between the first and second outer washers and in a manner so that the washers are rotatable with respect to one another.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
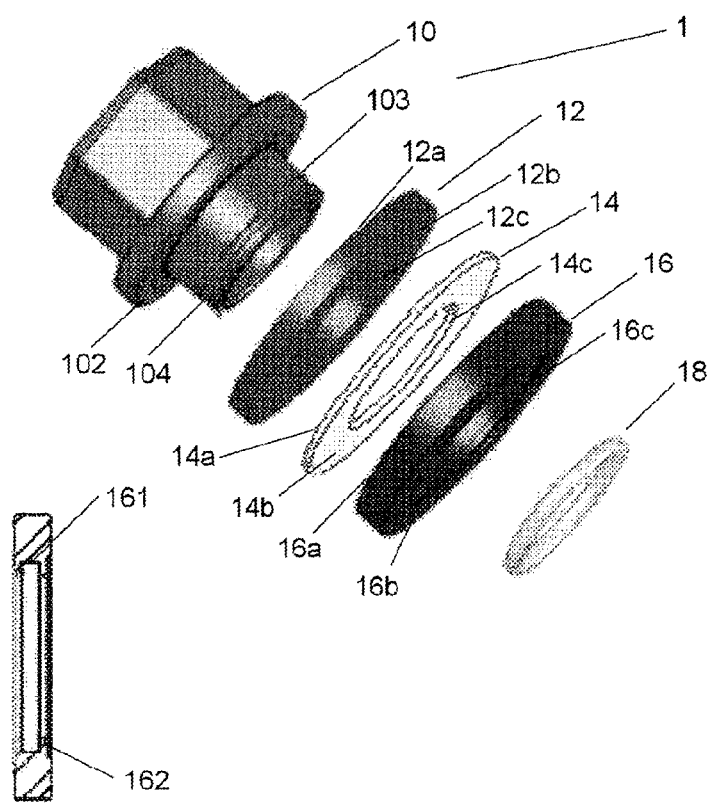
FIG. 1 is an exploded view of a fastener assembly.
Figure 2:
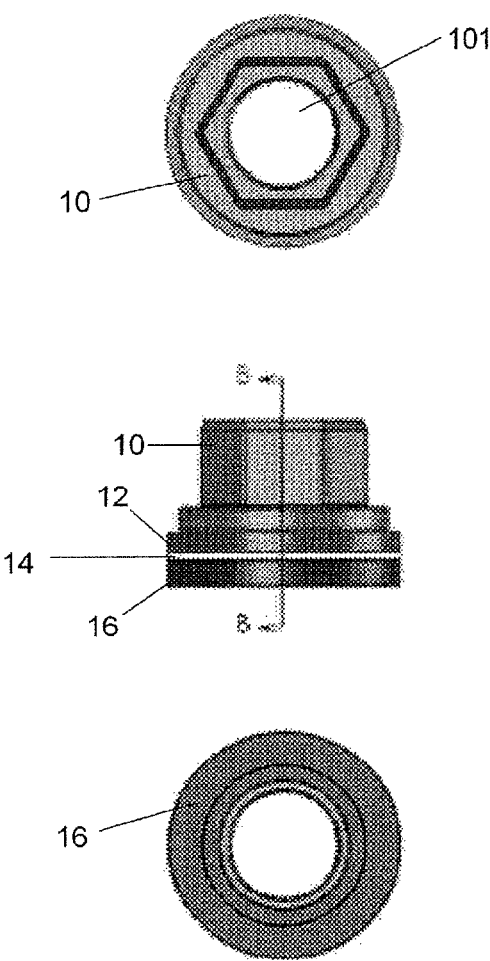
FIG. 2 is a top, side, and bottom view of the fastener assembly.
Figure 3:
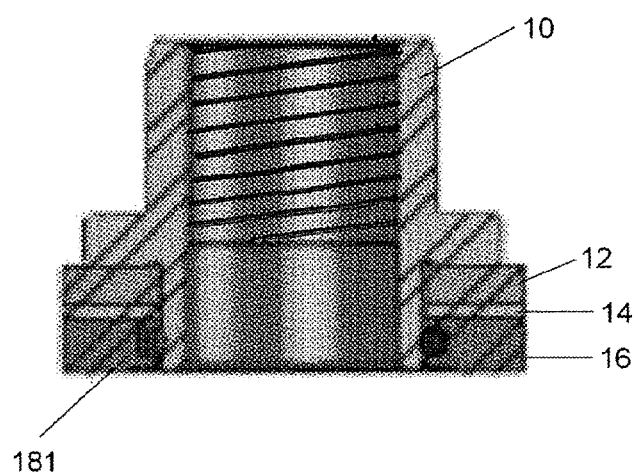
FIG. 3 is a cross-sectional view of the fastener assembly taken on the line BB of FIG. 2.
Figure 4:
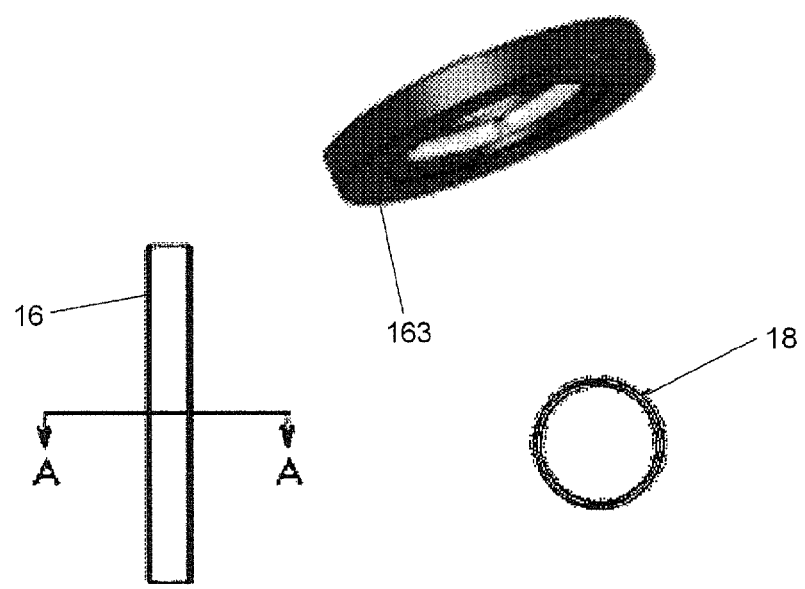
FIG. 4 is a side view of the outermost washer and a cross-sectional view of the outermost washer taken on the line AA.

Washers are used to serve as a seat for threaded fasteners to distribute the load over an area larger than that provided by the fastener surface. Unfortunately, the action of the washers on a clamping surface may cause galling. Galling is a form of surface damage that arises by the surface contact between two metals. Galling of the clamping surface or washer can damage the clamped surface or the washer to such an extent the part needs o be replaced. Further, galling of the clamping surface or the washer can cause the joint to loosen overtime and can create inconsistent torquing of the fastener. The problems associated with galling of the clamping surface or washer, however, are unexpectedly cured when at least three washers 12, 14, and 16 are combined with each other between the fastener and the clamping surface.

Referring to FIGS. 1-4 the fastener assembly 1 in accordance with the disclosure is shown, and broadly includes an innermost washer 12, an outermost washer 16, and interposed washer 14 positioned therebetween. The washers 12, 14, and 16 serve to distribute load and prevent engagement of the fastener directly with the clamping surface. The combination of at least three washers 12, 14, and 16 has the unexpected result of reducing or eliminating galling of the clamping surface.

The unexpected result of the disclosed fastener assembly 1 is advantageously applied to engines but can also be applied to other components. The fastener assembly 1 is used with threaded fasteners, such as a threaded stud, threaded bolt or other threaded structure, to secure a pair of work pieces, such as cylinder heads to an engine block. The fastener assembly 1 positioned on the clamping surface reduces or eliminates galling of the clamping surface and/or the assembly itself.

The disclosure will now be discussed in detail; generally, the innermost washer 12, interposed washer 14, and outermost washer 16 have first and second opposing flat faces, 12a, 12b, 14a, 14b, 16a, and 16b respectively. Each washer 12, 14, and 16 has inner edge, of which define an outer edge of a bore, 12c, 14c, and 16c, respectively, and further includes a body 10 having a threaded bore and a seating surface 102 normal to the bore 101 and a locking mechanism 181 to hold the fastener assembly 1 together. The washers 12, 14, and 16 are combined face to face with the innermost washer's flat face 12a adjacent to the seating surface 102 of the body 10.

The body 10 can be a conventional hexagonal nut for engaging a threaded stud or bolt, wherein the bottom outside surface of the nut is the seating surface 102. Alternatively, as in the illustrated embodiment, the body 10 can include a cylindrical portion 103 coaxial with the threaded portion of the body 10 and adjacent to the seating surface 102. The three washers can be assembled onto the body 10 by engaging the respective internal bores of the three washers 12c, 14c, and 16c over the cylindrical portion 103. The portion 103 can also have a shape different than cylindrical. The body can also be in the form of a bolt or other threaded structure for engaging a threaded bore or other threaded structure of another component.

The cylindrical portion 103 of the body 10, in the illustrated embodiment, is of a length less than the thickness of the sum of washers 12, 14, and 16 to prevent interference with the outermost washer's 16 clamping function; however, the cylindrical portion 103 is of sufficient length to properly engage the respective washers 12, 14, and 16 and retain the washers 12, 14, and 16 with respect to the body 10.

In the illustrated embodiment, the cylindrical portion 103 includes an annular groove 104 for engaging a retaining ring 18 of the locking mechanism 181, here shown as a split ring, but which can also be in other forms. The annular groove 104 extends around the periphery of the cylindrical portion 103. An internal annular groove 161 circumscribes the inner bore 16 of the outermost washer 16 and is positioned sufficiently deep to entirely accommodate the retaining ring 18 therein, and retracted from outer face 16b of washer 16 that contacts the clamped surface. Thus, engagement between the retaining ring 18 and the grooves 104 and 161 locks the components into an assembly where each of the washers can respectively rotate independently of one another. In one embodiment, the annular groove 161 is separated from the outer surface 16b and has a U-shaped cross-section with the ring 18 positioned between the legs of the U and the depth of the groove 161 being deeper than the wire diameter of the retaining ring 18. This arrangement locks the outermost washer 16 to the body 10 in an axial position. The innermost washer 12 and interposed washer 14 are retained in an axial arrangement between the outermost washer 16 and the seating surface 102 of the body 10. In this embodiment, each washer 12, 14, and 16 in the assembly 1 is free to rotate about its axis with respect to the body 10. It should be recognized that while the washers are respectively able to rotate to one another, the outer washers may or may not rotate with respect to the fasteners or objects to be clamped that they respectively engage. For instance, washer 16 may stop rotating with respect to the object to which it engages (such as a clamping surface of a cylinder head) when it comes into contact with such object.

Grooves 104 and 161 can have other configurations to accommodate retaining rings of different configuration. Groove 161 can also have one side completely open toward the outer face 16b. See, for instance, the embodiments shown in FIGS. 5 and 7. In either case, groove 161 is configured to allow a certain amount of axial movement of washer 16 with respect to seating surface 102 to take up clearance between the seating surface and the washers as the assembly is tightened.

The outermost washer 16, in the illustrated embodiment, can also include a recess 162 on its engaging surface 163 around its internal bore 16c to provide clearance between the outermost washer 16 and any projecting material surrounding the threaded fastener on the clamping surface.

In one embodiment, the innermost washer 12 and the interposed washer 14 may be conventional washers, wherein each are provided with the central bore 12c and 14c, respectively, and have a suitable bore diameter so as to loosely receive the cylindrical portion 103 and an outer diameter so as to properly perform their clamping function. Also, it will be appreciated that one or more of the washers 12, 14, and 16 could by made of material different than the other washers 12, 14, and 16. For example, the outermost washer 16 could be composed of a material harder than the innermost washer and interposed washer 12 and 14, respectively. In one embodiment, the outer washer 16 is constructed of hardened bronze with a hardness of ~35 Rc and washers 12 and 14 are each thrust washers constructed of a material different than hardened bronze, such as steel, and can be supplied by Torrington®. Washers 12 and 14 can be constructed of the same or different materials. The washers 12, 14 and 16 can have similar thicknesses or different thicknesses. In one embodiment, the thickness of the intermediate washer 14 is thinner than the other two washers, with the outer washers being made thicker to better endure the stresses of direct engagement with the seating surface and fastening surface and the inner washer, which is only under a clamping force between the outer washers, can be made thinner to reduce an overall height and weight of the washer stack, and thus, the assembly. The nut/fastener 10 can be made of steel or other material and heat treated. The other components can also be heat treated.

With the present invention assembly, it has been unexpectedly found that galling of the fastening surface, such as an aluminum cylinder head, has been eliminated when torquing down the fastener/fastener assembly of the present invention. As such, the assembly can be reused through numerous assembly/disassembly operations without requiring expensive replacement of the assembly or repair of the cylinder head (or other component to be fastened). It has also been unexpectedly found that the torque required to properly tighten the fastener assembly onto a threaded fastener remains very consistent throughout repeated tightenings and loosenings and also from fastener to fastener, and therefore, allows the cylinder head (or other component) to be more accurately torqued down with respect to the engine block (or other component). This is a significant improvement over the known practice, where the cylinder head, washer and/or nut/bolt can become galled after even the first tightening and the torque required to properly tighten the known nut is inconsistent from fastener to fastener used on a component and even on the same fastener over repeated tightenings.

Figure 5:
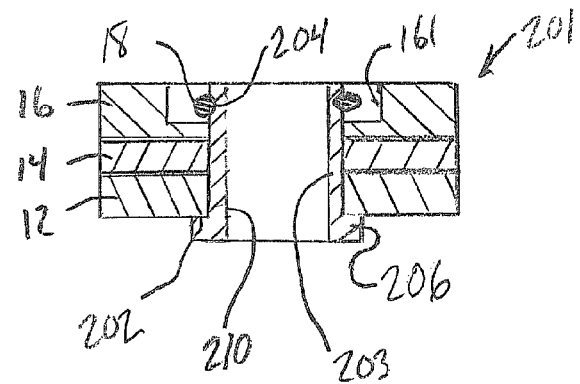
FIG. 5 is a sectional view of an alternative embodiment of the present invention.

In an alternative embodiment shown in FIG. 5, the washers can be configured as a load bearing assembly 201 separate from a fastener. Here, washers 12, 14 and 16 are stacked on a tubular body 210 having a cylindrical portion 203, a radially expanded portion 206 having a seating surface 202 for engaging washer 12, and an annular groove 204 for engaging a retaining ring 18. The seating surface 202 can engage an outer surface of the washer 12 or the washer 12 can have an inner annular groove similar to washer 16 so that the radially expanded portion 206 can be recessed below the outer surface of the washer 12. In the configuration shown in FIG. 5, the surface of the object on which the assembly 201 is positioned can also be counterbored or relieved to receive the radially expanded portion 206.

Figure 6:
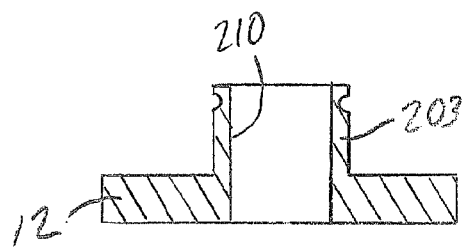
FIG. 6 is a partial sectional view of a further alternative embodiment of the present invention.

In the alternative embodiment shown in FIG. 6, washer 12 can be integrally formed with the tubular body 210 as a single piece.

Figure 7:
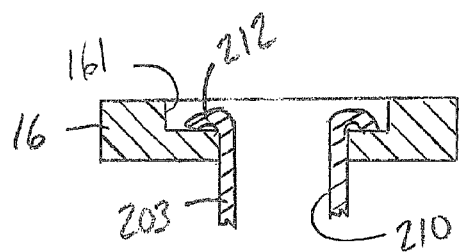
FIG. 7 is a partial sectional view of a further alternative embodiment of the present invention.

In the alternative embodiment shown in FIG. 7, the locking mechanism can include a formed edge 212 of the tubular body that engages the washer to clamp the assembly together. The formed edge 212 can be formed by crimping, rolling, or in another manner.

Figure 8:
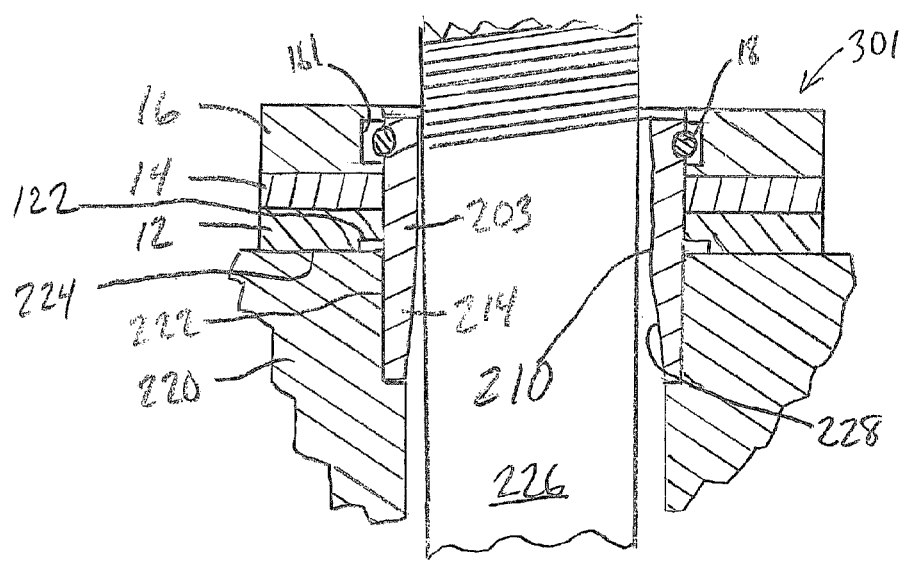
FIG. 8 is a sectional view of a further alternative embodiment of the present invention.

In the alternative embodiment shown in FIG. 8, load bearing assembly 301 includes a tubular body 210 having an extended portion 214 that extends beyond the stack of washers 12, 14 and 16. This extended portion 214 can have a cylindrical or other shape for being pressed into a counterpart counterbore 222 of an object 220 to which a clamping force is to be applied, such as a cylinder head. The engagement between the extended portion 214 and the counterbore 222 is preferably an interference fit so that the assembly 301 can be installed on the object 220 and will remain in place when fasteners are removed, for instance, when a cylinder head is being removed from a cylinder block. The tubular body is pressed into the object 220 a determined distance such that there is enough axial looseness in the assembly for the washers to still rotate with respect to one another. The axial clearance between the locking ring 18 and an outer edge of the annular groove 161 allows that axial looseness to be taken up when the washers are clamped tight by the fastener. In this embodiment, the object 220 itself provides one side of the locking mechanism for maintaining the assembly 301 in the assembled state, with washer 12 engaging a clamping surface 224 of object 220. The extended portion 214 can be fixed with respect to the counterbore 222 in an alternative manner, including by a threaded engagement, an adhesive engagement or in some other manner. Threaded stud 226 passes through the assembly 301 for engagement with a threaded nut. Alternatively, item 226 could be a bolt or other type of fastener. Tubular body 210 can have an internally relieved portion 228 for ease of passage of stud 226 though the assembly 301. Washer 12 can include an annular recess 122 similar to recess 162 of other embodiments.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. It is intended that various aspects of the various embodiments can be combined in different combinations to create alternative embodiments within the scope of the present invention. Modifications and substitutions by one of ordinary skill in the art are considered to be within the scope of the present invention, which is not to be limited except by the following claims.

What is claimed is:

1. A fastener assembly comprising:
 a threaded fastener having a seating surface normal to an axis of the threaded fastener;
 at least three coaxial washers positioned normal to the axis, wherein an innermost washer engages the seating surface, an outermost washer is adapted to engage a clamping surface, and an interposed washer is positioned therebetween, each of the innermost washer, the outermost washer and the interposed washer having opposing flat faces parallel to each other in an unstressed condition to engage one another face to face; and
 a locking mechanism to combine the washers to the threaded fastener in a manner which allows independent movement of the washers, the locking mechanism engaging the outermost washer such that an entirety of the locking mechanism is axially recessed away from an outermost of the flat faces of the outermost washer in an axial direction toward the innermost washer.

2. The fastener assembly of claim 1, wherein the threaded fastener further comprises a cylindrical portion coaxial with the axis and adjacent to the seating surface, the cylindrical portion engaging internal bores of the three washers to position the washers with respect to the threaded fastener.

3. The fastener assembly of claim 2, further comprising an annular groove extending around a periphery of the cylindrical portion.

4. The fastener assembly of claim 3, further comprising an annular groove circumscribing the inner bore of the outermost washer.

5. The fastener assembly of claim 4, wherein the locking mechanism further comprises a locking ring disposed in the annular groove of the outermost washer, wherein the locking ring engages the annular groove on the cylindrical portion.

6. The fastener assembly of claim 5, wherein the depth of the annular groove of the outermost washer is greater than a thickness of the retaining ring and the retaining ring is retracted from an outer face of the outermost washer.

7. The fastener assembly of claim 1, wherein the outermost washer further comprises a recess around the internal bore to provide clearance between the washer and any projecting material surrounding a threaded component to which the threaded fastener engages.

8. The fastener assembly of claim 1, wherein at least the outermost washer and one of the other washers are constructed of dissimilar material.

9. The fastener assembly of claim 1, wherein the threaded fastener is a nut.

10. The fastener assembly of claim 1, wherein the threaded fastener is a bolt.

11. A fastener assembly comprising:
 a body having a threaded bore, a seating surface normal to the threaded bore, and a cylindrical portion coaxial with the threaded bore and adjacent to the seating surface;
 at least three coaxial washers positioned normal to the threaded bore, wherein each washer has an internal bore engaged by the cylindrical portion to position the washers with respect to the body, and wherein an innermost washer engages the seating surface, an outermost washer is adapted to engage a clamping surface, and an interposed washer therebetween, each of the innermost washer, the outermost washer and the interposed washer having opposing flat faces parallel to each other in an unstressed condition to engage one another face to face; and
 a locking mechanism to combine the washers to the body in a manner which allows independent movement of the washers.

12. The fastener assembly of claim 11, further comprising an annular groove extending around a periphery of the cylindrical portion.

13. The fastener assembly of claim 12, further comprising an annular groove circumscribing the inner bore of the outermost washer.

14. The fastener assembly of claim 13, wherein the locking mechanism further comprises a locking ring disposed in the annular groove of the outermost washer, wherein the locking ring engages the annular groove on the cylindrical portion.

15. The fastener assembly of claim 14, wherein the depth of the annular groove of the outermost washer is greater than a thickness of the retaining ring.

16. A load bearing assembly comprising:
 a first outer washer having an outwardly exposed first annular surface for engaging a clamping surface of a fastener and a second annular surface opposite the first annular surface;
 a second outer washer having a third annular surface outwardly exposed in an opposite direction from the outwardly exposed first annular surface of the first outer washer, the outwardly exposed third annular surface of the second outer washer for engaging a clamping surface of an object to which the fastener exerts a clamping force, the second outer washer also having a fourth annular surface opposite the third annular surface;
 an intermediate washer having a fifth annular surface and a sixth annular surface opposite the fifth annular surface and positioned between the first outer washer and the second outer washer such that the fifth annular surface engages the second annular surface and the sixth annular surface engages the fourth annular surface, each of the annular surfaces being flat and parallel to each other in an unstressed condition; wherein each washer has an internal axial bore for positioning over a body of at least one chosen from the fastener and a stud portion to which the fastener fastens;
 a locking mechanism axially interconnecting the first and second outer washers together in a stacked configuration with the intermediate washer positioned between the first and second outer washers and in a manner so that the washers are rotatable with respect to one another;

wherein the locking mechanism includes:
a tubular body for engaging the internal axial bores of the intermediate washer and at least one of the outer washers, and
at least one radially expanded portion for engaging a surface of at least one of the washers to retain the washers in the stacked configuration;
wherein the tubular body includes an annular groove and the radially expanded portion is a locking ring disposed in the annular groove.

17. The load bearing assembly of claim 16, wherein one of the outer washers includes an annular groove circumscribing its internal axial bore, and the locking ring is disposed in the annular groove of the outer washer.

18. The load bearing assembly of claim 16, wherein the tubular body includes a first portion on one end for engaging the washers and an axially extended second portion on an opposite end for positioning in and fixedly engaging a bore in the object to be clamped.

19. The load bearing assembly of claim 16, wherein one of the outer washers is an integral portion of the tubular body and the intermediate washer and the other of the outer washers are stacked on the one of the outer washers and around the tubular body, with the radially expanded portion engaging the other of the outer washers.

20. The load bearing assembly of claim 16, wherein the second outer washer is constructed of hardened bronze and at least one of the other washers is constructed of a dissimilar material.

21. The load bearing assembly of claim 16, and further comprising a threaded fastener which includes the clamping surface for engaging the outwardly exposed annular surface of the first outer washer.

22. The load bearing assembly of claim 21, wherein the locking mechanism includes:
a tubular body for engaging the internal axial bores of the intermediate washer and at least one of the outer washers, the tubular body having a threaded bore portion forming, in part, the threaded fastener.

23. A load bearing assembly comprising:
a first outer washer having an outwardly exposed first annular surface for engaging a clamping surface of a fastener and a second annular surface opposite the first annular surface;
a second outer washer having a third annular surface outwardly exposed in an opposite direction from the outwardly exposed first annular surface of the first outer washer, the outwardly exposed third annular surface of the second outer washer for engaging a clamping surface of an object to which the fastener exerts a clamping force, the second outer washer also having a fourth annular surface opposite the third annular surface;
an intermediate washer having a fifth annular surface and a sixth annular surface opposite the fifth annular surface and positioned between the first outer washer and the second outer washer such that the fifth annular surface engages the second annular surface and the sixth annular surface engages the fourth annular surface, each of the annular surfaces being flat and parallel to each other in an unstressed condition; wherein each washer has an internal axial bore for positioning over a body of at least one chosen from the fastener and a stud portion to which the fastener fastens;
a locking mechanism axially interconnecting the first and second outer washers together in a stacked configuration with the intermediate washer positioned between the first and second outer washers and in a manner so that the washers are rotatable with respect to one another;
wherein the locking mechanism includes:
a tubular body for engaging the internal axial bores of the intermediate washer and at least one of the outer washers, and
at least one radially expanded portion for engaging a surface of at least one of the washers to retain the washers in the stacked configuration;
wherein the radially expanded portion is a formed portion of the tubular body.

24. The load bearing assembly of claim 23, wherein one of the outer washers includes an annular groove circumscribing its internal axial bore, and the formed portion of the tubular body is formed to be positioned within the annular groove of the outer washer.

* * * * *